(12) United States Patent
Gladstone et al.

(10) Patent No.: US 7,979,889 B2
(45) Date of Patent: Jul. 12, 2011

(54) METHODS AND APPARATUS PROVIDING SECURITY TO COMPUTER SYSTEMS AND NETWORKS

(75) Inventors: Philip J. S. Gladstone, Carlisle, MA (US); Jeffrey A. Kraemer, Wellesley, MA (US)

(73) Assignee: Cisco Technology, Inc., San Jose, CA (US)

( * ) Notice: Subject to any disclaimer, the term of this patent is extended or adjusted under 35 U.S.C. 154(b) by 1426 days.

(21) Appl. No.: 11/031,212

(22) Filed: Jan. 7, 2005

(65) Prior Publication Data

US 2006/0156380 A1    Jul. 13, 2006

(51) Int. Cl.
*H04L 9/00*    (2006.01)
(52) U.S. Cl. ............ 726/1; 726/2; 726/22; 726/23; 726/24; 726/25; 726/26; 726/27
(58) Field of Classification Search .......... 726/1, 2, 726/3, 11, 13, 22–27; 713/150–181, 187–188, 713/200, 201; 705/51, 57, 59; 707/9
See application file for complete search history.

(56) References Cited

U.S. PATENT DOCUMENTS

| | | | | |
|---|---|---|---|---|
| 6,321,338 B1 * | 11/2001 | Porras et al. | ............ | 726/25 |
| 6,542,993 B1 * | 4/2003 | Erfani | ............ | 726/1 |
| 6,601,048 B1 * | 7/2003 | Gavan et al. | ............ | 706/10 |
| 6,910,135 B1 * | 6/2005 | Grainger | ............ | 726/23 |
| 6,963,983 B2 * | 11/2005 | Munson et al. | ............ | 726/5 |
| 7,203,962 B1 * | 4/2007 | Moran | ............ | 726/23 |
| 7,237,267 B2 * | 6/2007 | Rayes et al. | ............ | 726/25 |
| 7,448,084 B1 | 11/2008 | Apap et al. | | |
| 7,546,629 B2 | 6/2009 | Albert et al. | | |
| 7,565,426 B2 | 7/2009 | Jones et al. | | |
| 7,715,315 B1 | 5/2010 | Ferguson et al. | | |
| 2002/0078049 A1 * | 6/2002 | Samar | ............ | 707/9 |
| 2002/0078381 A1 * | 6/2002 | Farley et al. | ............ | 713/201 |
| 2002/0083343 A1 * | 6/2002 | Crosbie et al. | ............ | 713/201 |
| 2002/0166063 A1 | 11/2002 | Lachman et al. | | |
| 2004/0205474 A1 | 10/2004 | Eskin et al. | | |
| 2004/0250124 A1 | 12/2004 | Chesla et al. | | |
| 2006/0021035 A1 * | 1/2006 | Conti et al. | ............ | 726/22 |
| 2006/0041936 A1 * | 2/2006 | Anderson et al. | ............ | 726/11 |
| 2006/0070118 A1 * | 3/2006 | Munson et al. | ............ | 726/3 |
| 2010/0082513 A1 | 4/2010 | Liu | | |
| 2010/0242111 A1 | 9/2010 | Kraemer et al. | | |

OTHER PUBLICATIONS

Anita K. Jones and Robert S. Sielken, "Computer System Intrusion Detection: A Survey", Feb. 2000, University of Virginia.*
Alexander Seleznyov and Seppo Puuronen, "HIDSUR: A Hybrid Intrusion Detection System Based on Real-time User Recognition," pp. 41-45, IEEE, 2000.*

(Continued)

*Primary Examiner* — Vivek Srivastava
*Assistant Examiner* — Hee Song
(74) *Attorney, Agent, or Firm* — Hickman Palermo Truong & Becker LLP

(57) ABSTRACT

A system provides security to a computerized device by detecting a sequence of related processing operations within the computerized device and recording the sequence of related processing operations in a security history. The system identifies a security violation when a processing operation performed in the computerized device produces an undesired processing outcome that violates a security policy and subsequently detecting attempted performance of at least one processing operation that attempts to produce the undesired processing outcome that violates the security policy and in response, denies operation of the processing operation(s) within the computerized device to avoid violation of the security policy.

35 Claims, 8 Drawing Sheets

OTHER PUBLICATIONS

Klaus Julisch, "Using Root Cause Analysis to Handle Intrusion Detection Alarms", PhD Thesis, University of Dortmund, Germany (2003).*

English translation of: State Intellectual Property Office of the People's Republic of China Office Action of co-pending Chinese Patent Application No. 200680000999.3 having an issue date of Dec. 19, 2008.

Chinese patent application No. 200680000999.3, third Office Action dated Dec. 31, 2010; 15 pages.

Chinese patent application No. 200680000999.3, current claims, 6 pages.

U.S. Appl. No. 11/414,909, filed May 1, 2006, Final Office Action, mailed Mar. 9, 2011.

* cited by examiner

METHODS AND APPARATUS PROVIDING SECURITY TO COMPUTER SYSTEMS AND NETWORKS

Computer systems, networks and data centers are exposed to a constant and differing variety of attacks that expose vulnerabilities of such systems in order to compromise their security and/or operation. As an example, various forms of malicious software program attacks include viruses, worms, Trojan horses and the like that computer systems can obtain over a network such as the Internet. Quite often, users of such computer systems are not even aware that such malicious programs have been obtained within the computer system. Once resident within a computer, a malicious program that executes might disrupt operation of the computer to a point of inoperability and/or might spread itself to other computers within a network or data center by exploiting vulnerabilities of the computer's operating system or resident application programs. Other malicious programs might operate within a computer to secretly extract and transmit information within the computer to remote computer systems for various suspect purposes. As an example, spyware is a form of software that can execute in the background (e.g., unbeknownst to users) of a computer system and can perform undesirable processing operations such as tracking, recording and transmitting user input from the spyware-resident computer system to a remote computer system. Spyware can allow remote computes to silently obtain otherwise confidential information such as usernames and passwords required to access protected data, lists, contents of files or even remote web sites user account information.

Computer system developers, software developers and security experts have created many types of conventional preventive measures that operate within conventional computer systems in an attempt to prevent operation of malicious programs from stealing information or from compromising proper operation of the computer systems. As an example, conventional virus detection software operates to periodically download a set of virus definitions from a remotely located server. Once the virus detection software obtains the definitions, the security software can monitor incoming data received by the computer system, such as email messages containing attachments, to identify viruses defined within the virus definitions that might be present within the data accessed by the computer. Such data might be obtained over a network or might be unknowingly resident on a computer readable medium, such as a disk or CD-ROM, that a user inserts into the computer. Upon detection of inbound data containing a virus or other malicious program, the virus detection software can quarantine the inbound data so that a user of the computer system will not execute code or access the data containing the detected virus that might result in compromising the computer's operation.

Other examples of conventional malicious attacks, intrusions, or undesirable processing that can cause problems within computer systems or even entire computer networks include virus attacks, worm attacks, trojan horse attacks, denial-of-service attacks, a buffer overflow operations, execution of malformed application data, and execution of malicious mobile code. Virus attacks, worm attacks, and trojan horse attacks are variants of each other that generally involve the execution of a program, for which a user often is unaware of its existence, that performs some undesired processing operations to comprise a computer's proper operation. A denial-of-service attack operates to provide an intentional simultaneous barrage of packets (e.g., many connection attempts) emanating from many different computer systems to one or more target computer systems, such as a web site, in order to intentionally cause an overload in processing capabilities of the target computer resulting in disruption of service or a business function provided by the target computer. Denial of Service attacks may also seek to crash the targeted machine (rather than simply consume resources). Buffer overflow attacks occur when programs do not provide appropriate checks of data stored in internal data structures within the software that result in overwriting surrounding areas of memory. Attacks based on buffer overflows might allow an attacker to execute arbitrary code on the target system to invoke privileged access, destroy data, or perform other undesirable functions. Malformed application data attacks might result in an application containing a code section that, if executed, provides access to resources that would otherwise be private to the application. Such attacks can expose vulnerabilities due to an incorrect implementation of the application, for example by failing to provide appropriate data validity checks, or allowing data stream parsing errors, and the like.

Many of the conventional malicious programs and mechanisms for attack of computer systems, such as viruses and worms, include the ability to redistribute themselves to other computer systems or devices within a computer network, such that several computers become infected and experience the malicious processing activities discussed above. Some conventional attempts to prevent redistribution of malicious programs include implementing malicious program detection mechanisms such as virus detection software within firewalls or gateways between different portions of networked computer systems in order to halt propagation of malicious programs to sub-networks.

SUMMARY

Current mechanisms for providing security to computers and computer networks suffer from a variety of deficiencies. Embodiments of the invention provide numerous advantages over such conventional systems to avoid such deficiencies. In particular, conventional systems for protecting from malicious attacks to computer systems such as virus detection software rely strictly on the ability to periodically remotely receive information such as virus definitions that allow the conventional security software to identify and quarantine malicious programs. Many of the most common conventional forms of security software such as virus definitions programs rely upon obtaining the periodic virus definition updates from a centralized server accessed over the Internet that is maintained by the vendor of the security software. As a result, the most recent virus definition updates only reflects those viruses that have been recently detected, fingerprinted in inserted into the virus definition file by the vendor of that maintains and distributes the virus definition files.

Because such conventional protection systems require periodic updates, such conventional systems are only as good as the most recent updates of the malicious program definitions (e.g., virus definitions) that individual instances of the conventional protection software have been able to receive. As an example, conventional virus detection software will not recognize viruses created and transmitted to a computer system that have not yet been identified and/or defined within the most recent update of a set of virus definitions obtained from a remote server. Accordingly, the malicious program code or data not defined within the most recent virus definitions update may be successfully inserted and executed within computer systems in a network in order to perform some of the malicious processing discussed above, even though such systems are equipped with conventional security software (i.e., virus detection software).

As a result, conventional security software implementations are often several steps behind the prevention and spread of new attacks that are constantly being created and disseminated by malicious program developers. This problem is compounded by the fact that modern malicious programs are able to distribute themselves quickly to hundreds or thousands of computer systems on a network such as the Internet within a short amount of time, such as several hours, whereas most conventional security software only obtains updates on a less frequent basis, such as nightly.

Embodiments of the invention significantly overcome the aforementioned drawbacks and provide a security system for computer systems and networks that rapidly identifies malicious attacks and prevents the spread of such attacks to other computer systems. In effect, embodiments of the invention provide for a self-healing computer network system. Configurations of the invention include one or more security agents that operate within individual host computer systems in a network. The security agents can interact with a management center to obtain a security policy that contains a set of rules that indicate types of operations that may be allowed or disallowed within computer system. Once an agent has obtained the security policy, the agent operates a plurality of security interceptors that can watch over and monitor processing operations performed by various software and hardware components within the host computer system which that security agent protects. The security agent provides security to a computerized device by detecting processing outcomes produced via operation of a sequence of related processing operations within the computerized device. As an example, processing operations related to an inbound connection to a Web server can be monitored by various interceptors operating within different parts of the computer system's operating system and application layer code in order to detect the related sequence of processing operations that the inbound Web server connection attempt triggers. Each interceptor detects a specific event and transfers that event to an event correlation engine that records the processing outcomes and the sequence of related processing operations in a security history. The event correlation engine identifies a security violation when one of the detected processing operations in the security history produces a processing outcome that violates a security policy. This may be before, during or after occurrence of an undesired processing outcome within computer system such as a system crash, system error, protection violation, process disruption or other such undesired action as defined within the security policy. The security agent is then able to subsequently detect attempted performance of a similar sequence of related processing operations that attempt to produce at least one processing outcome that violates the security policy. In response, the security agent denies operation of at least a portion of the sequence of related processing operations within the computerized device to avoid violation of the security policy. The security agents can also mark or otherwise identify sequences of processing operations that led up to the security violation as a dissallowed sequence of processing operations and can disseminate this information to other security agents operating on other host computer systems in the network in real-time (e.g., upon detection) in order to spread the knowledge of the behavior or processing pattern that the malicious attack attempted to perform on the computer system the detected the attack, so that other computer systems will not be vulnerable to the attack.

In this manner, embodiments of the invention detect a security violation based on processing behavior and identify or mark the processing steps that led up to the security violation. In essence, configurations disclosed herein can identify a processing failure and can learn the reasons that caused the failure so that such processing steps will be disallowed in the future. Configurations disclosed herein can identify processing operations such as a sequence of system calls that a malicious program has properly orchestrated to cause a failure and the security agent maintains a security history of those calls that resulted in the failure so that a similar sequence calls executed in the future will be prevented, thus preventing the failure.

Other embodiments of the invention include any type of computerized device, workstation, handheld or laptop computer, or the like configured with software and/or circuitry (e.g., a processor) to process any or all of the method operations disclosed herein. In other words, a computerized device or a processor that is programmed or configured to operate as explained herein is considered an embodiment of the invention.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments of the invention.

It is to be understood that the system of the invention can be embodied strictly as a software program, as software and hardware, or as hardware alone such as within a processor, or within an operating system. Example embodiments of the invention may be implemented within computer systems, processors, and computer program products and/or software applications manufactured by Cisco Systems, Inc. of San Jose, Calif., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
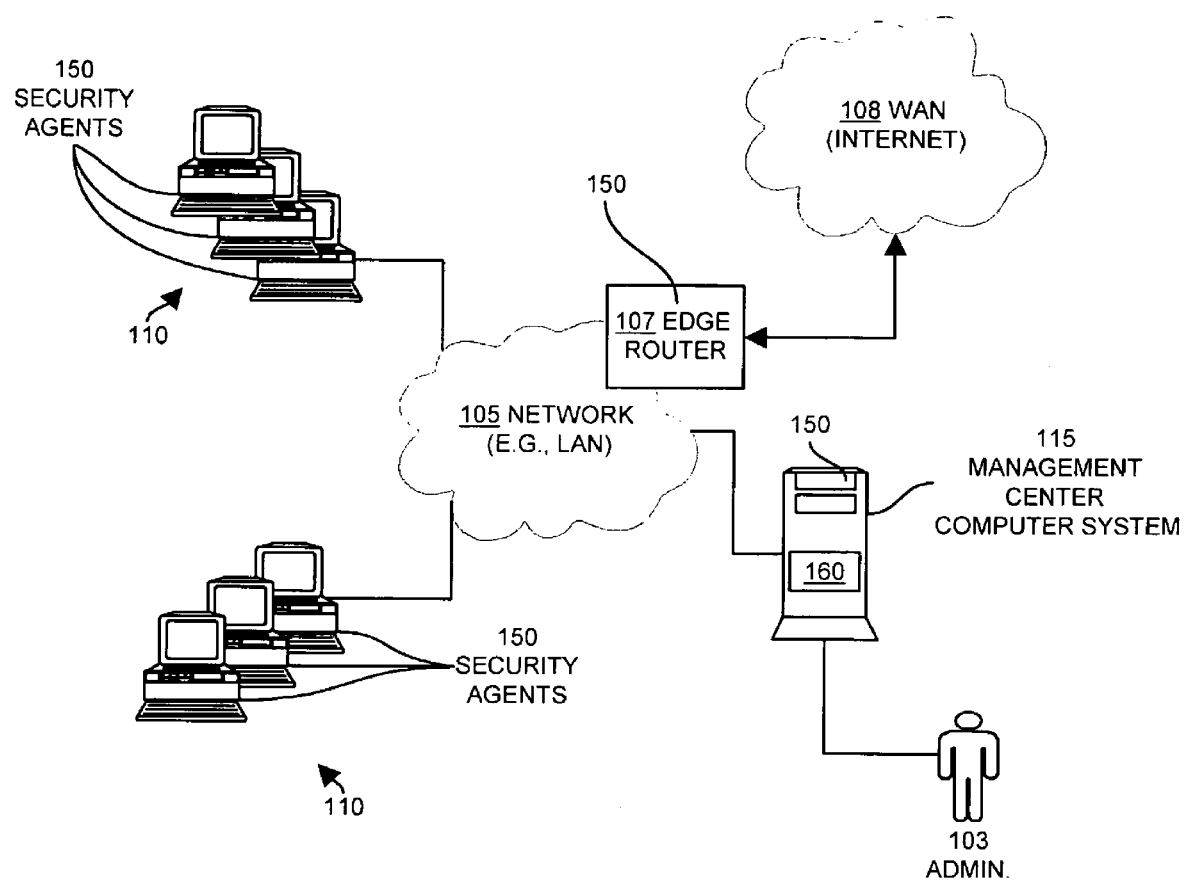
FIG. 1 illustrates an example configuration of a network environment that includes a security system configured as disclosed herein.

FIG. 1 illustrates an example computer networking environment suitable for use in explaining example embodiments of the invention. The computer networking environment includes a computer network 105 such as a local area network (LAN) that interconnects a security management computer system 115, an edge router 107 and a plurality of host computer systems 110, each of which operates (e.g., executes, runs, interprets or otherwise performs) a security agent 150 configured as disclosed herein. The security management computer system 115 also operates a management center application 160 that operates as disclosed herein. The edge router 107 couples the network 105 to a wide area network 108 such as the Internet that allows communication between the computer systems 110, 115 and other computers worldwide. Note that the management center computer 115 may be isolated form the WAN 108 by a firewall that is not shown in this example.

The host computers 110 may be any type of computer system, workstation, server (e.g., web server), personal computer, laptop, mainframe, personal digital assistant device, general purpose or dedicated computing device or the like that operate any type of software, firmware or operating system. They may be physically or wirelessly coupled to the network 105 to support communications. The security agents 150 and management center application 160 operate to dynamically detect and prevent malicious attacks on the computers 110 without requiring the security agents 150 to continuously and periodically download signature or virus definition files. Generally, an administrator 103 installs the security agents 150 on the computer systems 110 that are to be protected and they are responsible for enforcing the appropriate security policy on those systems.

The security agents 150 have the ability to learn what causes security violations such as malicious attacks by monitoring, analyzing and recording processing behavior and events of the computer system 110 that occur prior to the security violation taking place, in order to prevent such events from occurring in the future. In other words, the security system disclosed herein in able to monitor and record processing behavior that results in an undesired processing operation such as a process exception, system crash or the like and is able to analyze recorded processing operations that led up to undesired operation or problem to identify the root cause of the failure. Once identified, the security system is able to prevent that single operation or sequence of processing operations identified as the root cause of failure from executing again on that or other computer system in order to avoid further security violations and to prevent such attacks on other computers. A security agent as disclosed herein can thus learn of new types of malicious attacks without having seen processing that causes such attacks in the past, and can prevent that attack in the future. The ability to learn of processing associated with a new attack, identify its root cause, and prevent it from happening in the future can occur without external input (e.g., virus definition files) being received by a computer system equipped with the security agent.

Security agent operation as explained herein includes being preprogrammed with certain known security violations in a rule-based security policy and preventing them from happening even a first time. In addition, such processing also involves recording and post-processing security history event data that result in a security violation (i.e., that was not preprogrammed and thus unrecognizable a first time) to identify a root cause (e.g., one or more processing operations or events) of the security violation within the computer system in order to prevent it from happening a second time. This can involve performing a local comparison of several security histories collected by a security agent 150 in a single computer system 110 to identify a common pattern of processing activity that results in an undesirable processing outcome (i.e., a security violation). The security agents 150 can also transmit event and security history information to the management center 160.

The management center 160 acts as a central repository for all event log records generated by the security agents 150 and provides functions for monitoring and reporting. The management center 160 also correlates event records generated from security agents 150 operating on different computer systems 110 for purposes of detecting suspicious activity in the network.

Figure 2:
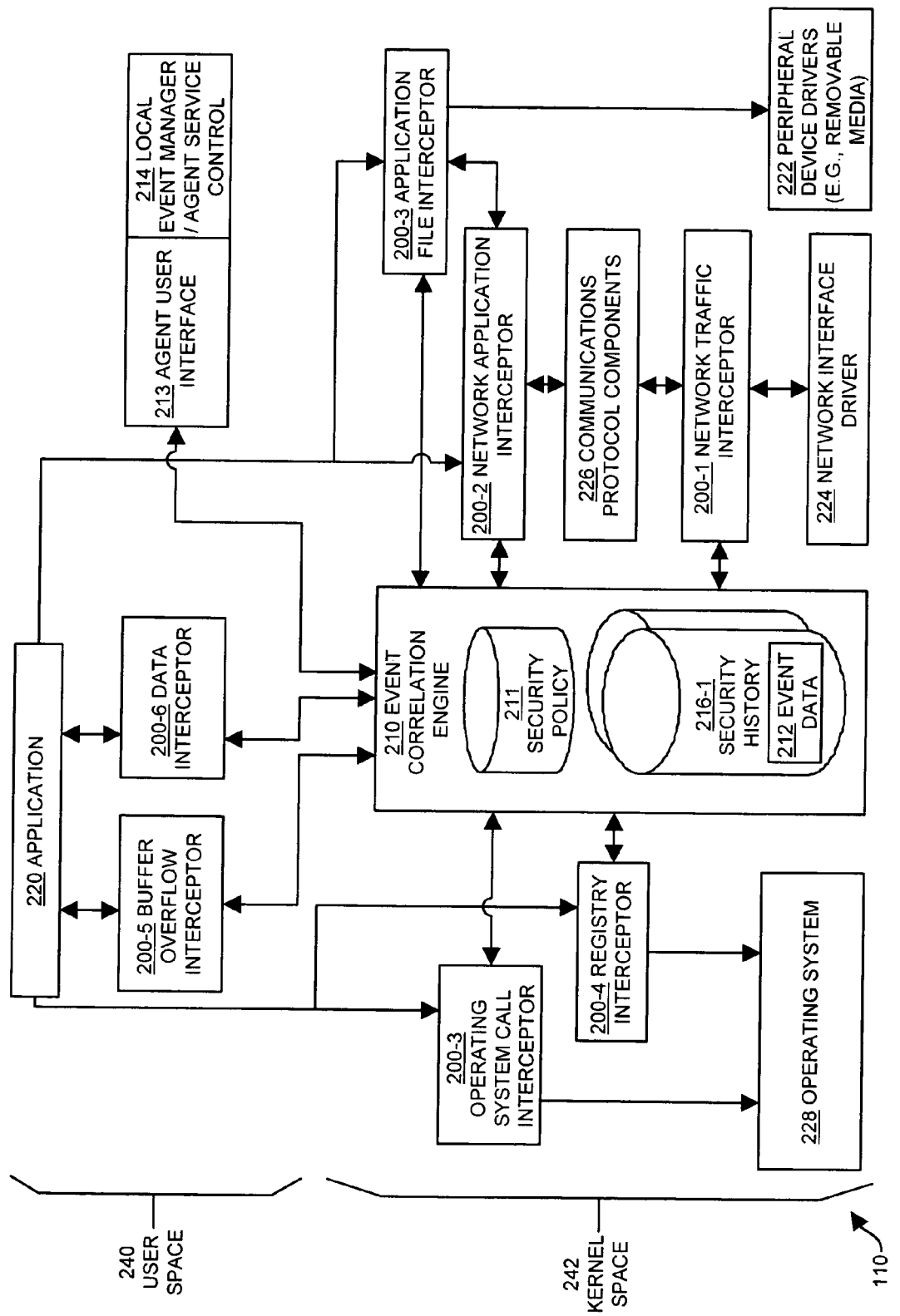
FIG. 2 illustrates example architecture of the computerized device configured with a security system in one example configuration.

FIG. 2 illustrates an architecture of a host computer system 110 configured with a security agent in accordance with one example embodiment. The security agent components include a plurality of security interceptors 200-1 through 200-7 including, for example, a network traffic interceptor 200-1, the network application interceptor 200-2, a file interceptor 200-3, a registry interceptor 200-4, a system call interceptor 200-5, a buffer overflow interceptor 200-6 and a data interceptor 200-7. The security agent 150 in this example configuration also includes an event correlation engine 210, an agent user interface 213, and local event manager 214. The event correlation engine 210 stores a security policy 211 that contains rules that are used to instruct the security agent 150 to protects the computer 110 on which it operates by interpreting and enforcing the rules to restrict the operations that may be performed by that computer 110. An administrator 103 uses the management center application 160 to create and distribute security policies to each computer system 110 to be protected.

In one configuration, the network traffic interceptor 200-1 resides between a TCP driver 221 and the network interface card 224 or other communications interface. The network traffic interceptor 200-1 looks at packets coming from the network before they get to the native operating system TCP stack and can detect malicious operations or instructions such as a remote computer scanning the computer system 110. Such attacks can include, for example, a ping of death attack, a TCP SYN flood attack, port scanning attacks and so froth. Other security interceptors 200 can include packet interceptors, connection interceptors, file sharing interceptors, data filter interceptors, registry interceptors, system call interceptors, and the like. The interceptors 200 can be installed and executed by using, for example, windows registry keys that create dependencies on standard MS Windows dynamically linked libraries (dlls) so that the interceptor dlls 200 are loaded along with the appropriate windows dlls that they monitor. The interceptors can thus serve as wrappers to monitor processing operations of all calls made to any specific computer components.

This example configuration also includes several components that operate within the computer system 110 that are not part of the security agent architecture itself. In particular, this example configuration includes one or more software applications 220 that execute within a user space 240 within the computer system 110. The computer system 110 further operates several components in kernel space 242 such as one or more device peripheral device drivers 222, a network interface driver 224, communications protocol components 226, and an operating system 228. It is to be understood that the components 222 through 228 are illustrated as separate for purposes of description of operation of the invention, and that they may be combined together, such as an operating system that includes device drivers 222 and communication protocol components 226.

Generally, according to operations of embodiments disclosed herein, the interceptors 200 monitor processing activities and collect and report event data 212 to the event correlation engine 210 for the respective standard processing components 220 through 228 within the user and kernel spaces 240 and 242. The event correlation engine 210 stores the event data within one or more security histories 216. Event data 212 can include things such as the identification of new connection requests made to the network interface driver 224, as detected by the network traffic interceptor 200-1. As another example, the application file interceptor 200-2 can identify a processing activity such as an application 220 accessing a particular file via an operating system call and report this as event data 212 to the event correlation engine 210. There may be other interceptors 200 besides those illustrated in FIG. 2 and thus the interceptors 201 through 206 are shown by way of example only. The event correlation engine 210 correlates the event data 212 against the security policy 211 in order to provide an indication to the interceptors 200 of whether or not the processing activity associated with the event data should be allowed. The event correlation engine 210 can also instruct the interceptors 200 to collect more or less event data 212 as needed. By being able to track operations, in the event of an undesirable processing operation, the behavior of the computer system 110 can be analyzed and the series of events that took place that lead up the undesirable processing operation can be "fingerprinted" and marked so that if they occur again, they can be prevented prior to their full execution. In addition, by recording traces from multiple failures and determining a commonality between them, if several computer systems suffer similar attacks, a commonality between the attacks can be identified and prevented in the future, even in situations where the attacking program morphs its identity or changes it content.

Figure 3:
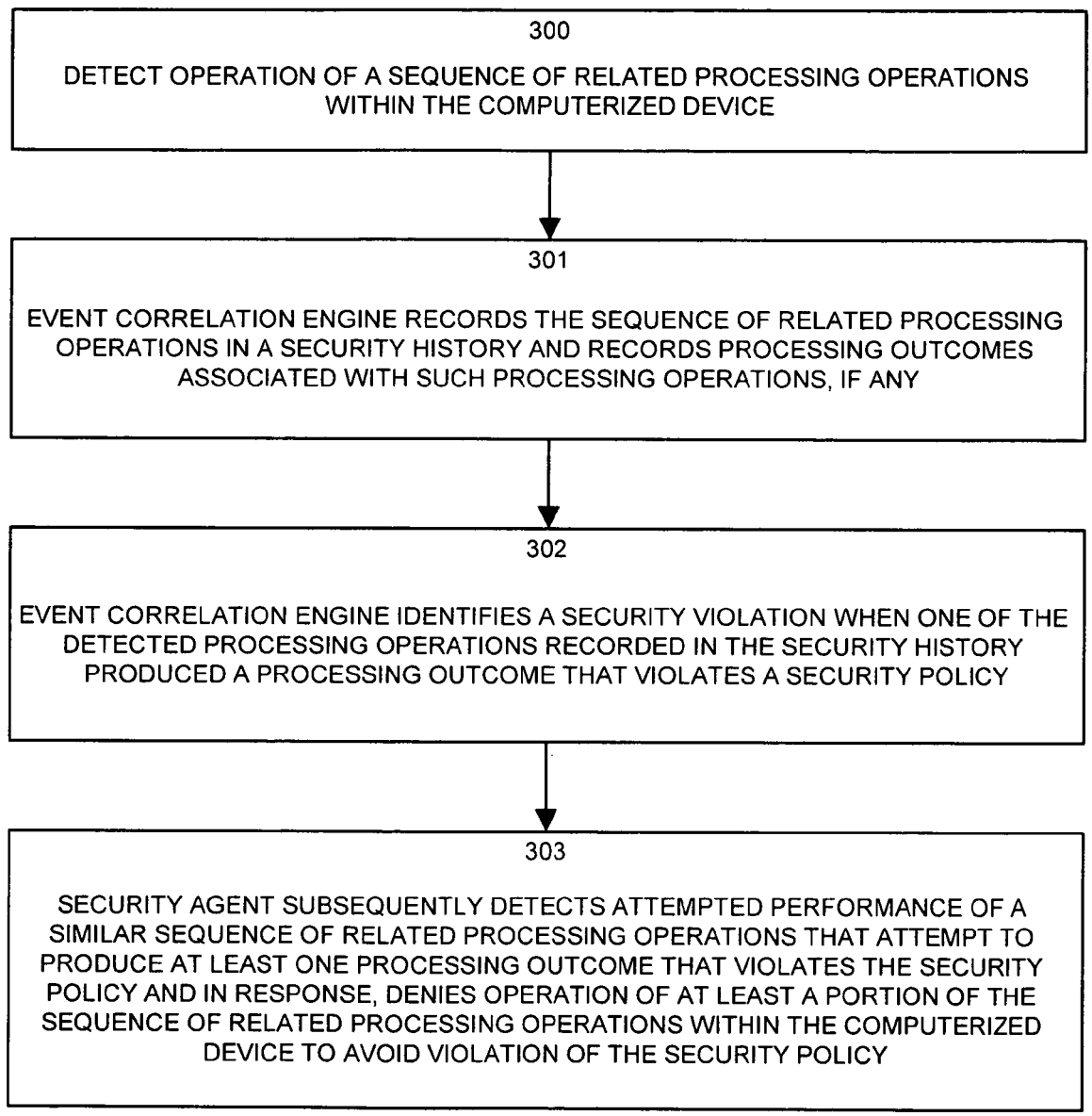
FIG. 3 is a flow chart of processing steps for providing security to a computerized device according to one example configuration disclosed herein.

FIG. 3 is a flow chart of high level processing steps that the security system performs in order to provide security to a computerized device 110 in accordance with one example embodiment.

In step 300, a security agent 150 detects operation of a sequence of related processing operations within the computerized device 110. This includes operating the security interceptors 200 to detect various processing operations of respective computer system components 222 through 228, and creating and transmitting event data 212 (e.g., event data records) to the event correlation engine 210 for storage within a security history 216. Each event data record 212 can identify the specific security interceptor 200 that provides the event data 212 along with a respective processing operation performed by the computer system component 220 through 228 that the security interceptor 200 is responsible for monitoring. Event data 212 can also include input data, parameters and/or processing results obtained or produced during operation of the specific processing operation of a component 220 through 228.

Example processing operations and/or data that an interceptor 200 can report within event data 212 include receipt of a packet of data from the network 105 that attempts to initiate a new communication session with the computer system 110. The event data 212 can also include specific information concerning the packet, such as an Internet Protocol (IP) address identifying a computer system or network device from which the packet originated, any data contents of the packet, and protocol information associated with the packet. As another example, if the event or processing operation being detected and reported is a file system access attempt made by an application 220 for access to a file (e.g., via a system call or device driver call to access the file on disk), a file interceptor 200-3 or operating system call interceptor 200-5 might produce an event data record 212 indicating the identity of the application 220, the identity of the specific file to be accessed, and the type of access requested the file.

In step 301, the event correlation engine 210 records the sequence of related processing operations in a security history 216 and records processing outcomes associated with such processing operations, if any. This includes receiving the event data 212 from the interceptors 200 and storing the event data 212 within the security history 216. Event data 212 stored within a single security history 216 from different security interceptors 200 identifies a sequence of related processing operations and in a typical configuration, a security history 216 will contain a set of records containing event data 212 that are reported from each interceptor 200 for a predetermined period of time of operation of the computer system 110.

As an example, a security history 216 may be a circular buffer of event data 212 that overwrites old event data with new event data after expiration of event data that has been stored for a predetermined amount of time (e.g., the last 30 minutes, or last 24 hours, or some other predetermined time period). The amount or frequency rate of collection of event data 212 produced from various security interceptors 200 may dictate the size of a security history 216. The security history may be stored locally in memory or may be stored persistently so as to be later available in event of a total crash of the computer system 110.

Recording of processing outcomes in step 301 occurs when the computer system 110 executes an undesirable processing operation such as a fault, crash, process interrupt or exception, or other outcome that may cause improper or undesirable processing within the computer system 110. The event correlation engine 210 can identify such undesirable processing operation after its occurrence and can associate this with the most recently collected security history 116.

In step 302, the event correlation engine 210 identifies a security violation when one of the detected processing operations recorded in the security history 216 produced a processing outcome that violates a security policy. As an example, if a sequence of related processing operations recorded in the security history 216 causes a security violation as defined within the security policy 211, the computer system 110 may experience a fault (e.g., system crash). After recovery, the security agent 150, which is executed at the beginning of the startup sequence of each reboot of the computer 110, provides an indication of the system crash within the security history 116.

In step 303, the security agent 150 subsequently detects attempted performance of a similar sequence of related processing operations that attempt to produce at least one processing outcome that violates the security policy 211 and in response, denies operation of at least a portion of the sequence of related processing operations within the computerized device 110 to avoid violation of the security policy 211. Accordingly, during operation, the interceptors 200 in one configuration report event data 212 to the event correlation engine 210 which records the event data in the security history 216. When undesired processing occurs, the event correlation engine 210 associates this undesired processing outcome with the pattern of processing recorded in the security history 216 that occurred prior to the undesired processing outcome. Thereafter, the event correlation engine can monitor event data 212 received from interceptors to identify when a similar pattern of processing is under progress that causes the undesired processing operation. The event correlation engine 210 can instruct an interceptor 200 to disallow a specific operation to prevent the otherwise undesired processing operation from occurring.

During a malicious attack, an undesired processing operation may attempt to be executed within any of the components for which the interceptors 200 are monitoring for event data 212. An example of another undesired processing operation is a buffer overflow attack that causes a processing exception or other event within a component operating within the user or kernel space 240 or 242. As an example of a buffer overflow attack, on a web server, that system of the invention can detect an overflow and can map it to a recently received URI (URL) that caused the fault. Thereafter, blocking new connections from sending this URI to the web server would block future occurrences of the fault. The "Code Red" worm is an example of a buffer overflow attack. Buffer overflow protection provided by embodiments disclosed herein will stop such a worm from doing damage, but the server might have to be stopped and restarted.

If the sequence of processing operations that lead up to the undesired operation has been encountered before, the interceptors 200 can be previously instructed by the event correlation engine 210 to prevent execution of one or more processing operations that were determined previously to be the root cause of a formerly detected buffer overflow security violation. On the first instance of such an attack, the sequence of processing steps leading up to the buffer overflow may not have been encountered in the past, and thus the buffer overflow undesired operation may be accomplished or executed, resulting in a process or thread failure, interruption, exception, or the like. The undesired operation might be so severe that may cause the computer system 110 to crash or otherwise cease operation that may even result in a reboot.

Upon recovering from the undesired processing operation, the event correlation engine 210 can identify the undesired processing operation occurred and can identify the sequence of processing events as specified by the event data 212 recorded within the security history 216 that caused (i.e., led up to occurrence of) the undesired processing operation. In response, in one configuration, the event correlation engine 210 notifies one or more of the interceptors 200 to be "on the lookout" for the root cause, or in other words, the sequence of processing operations that triggered the undesired operation, in order to prevent its occurrence in the future.

In one configuration, the event correlation engine 210 receives all event data from interceptors 200 in real-time, as the interceptors 200 detected each processing operation and report the event data 212 to the event correlation engine 210. In this configuration, the event correlation engine can compare the sequence of event data 210 to previously identified sequences of event data from security history's 216 that were collected in the past that resulted in a security violation. On the sequences of event data 212 transmitted to the interceptors 200 indicates an upcoming security violation, event correlation engine 210 can instruct one or more of the appropriate interceptors 200 to disallow a forthcoming processing operation that would result in the security violation.

In an alternative configuration, once the event correlation engine 210 identifies a root cause of a failure based on analysis of a security history 216 that resulted in undesired processing operation, the event correlation engine 210 can instruct one or more interceptors 200 to disallow specific processing instructions prior to the sequence of those processing instructions occurring. In this configuration then, the interceptors 200 are preprogrammed by the event correlation engine 210 to disallow specific processing operations that would result in security violations prior to encountering such operations The evaluation of event data 212 and identification of the root cause of an undesired processing operation can be granular, such that if the root cause is identified as occurring within a particular user application 220 or the within a particular user or kernel component 222 through 228, a specific security interceptor 200 associated with that application or component can be instructed to prevent that specific processing operation in the future in order to avoid security violation.

In an alternative configuration, event data collection can be minimal until the occurrence of an undesired processing operation. Thereafter, to the collection of event data can be increased for interceptors 200 associated with the type of undesired processing operation experienced in order to assist in more closely pinpointing the root cause of failure during an analysis process performed on the event data 212 within the security histories 216. For example, if the undesired processing operation is an abrupt halting of operation of a specific user application 220, the data interceptor 200-7 and/or the buffer overflow interceptor 200-6 can be instructed by the event correlation engine 210 to increase the amount of event data collected after the application 220 is restarted in order to be able to better analyze the collected event data 212 within the security history 216 in order to more closely pinpoint the root cause of the failure, should it happen again.

It is to be understood that the event correlation engine 210 is able to store separate security histories 216-1 through 216-X associated with separate recordings of sequences of operations that lead up to undesired processing operations. This can allow detection of a common sequence of events in two or more security histories that lead up to an undesired processing operation.

It is to be understood that the event correlation engine 210 in the security agent 150 in one computer system 110 is able to transmit event data 212 associated with one or more security histories 216 to the management center 160 which can perform a correlation operation between security histories containing event data 212 for multiple computer systems 110. This can happen in real-time, or close to real-time, in order to identify processing operations that indicate an entire computer network is undergoing a malicious attack.

As an example, embodiments of the invention can be used, for example, to detect and prevent, in real-time, a denial of service attack in which several computer systems 110 are under attack by receiving large amounts of packets from remote computer systems (e.g., from the Internet 108). This example of network rate limiting may also apply to network connections being sent to an application (like a web server), and not simply packets. In such cases, the network traffic interceptor 200-1 might be reporting large amounts of event data 212 indicating arrival of packets or connections at a rapid rate. While this information on its own may not indicate a denial of service attack, a rate of packets arrival that exceed a predetermined threshold can trigger the event correlation engine 210 in one configuration to transfer a recent segment of its security history 216 to the management center 160. If several computer systems 110 within the network 105 were experiencing similar high rates of packet arrival from remote sources, the management center 160 is able to identify this processing pattern within sections of security histories 216-1 through 216-X for each computer system 110 in which the packet arrival rate exceeded the predetermined threshold. Based on this pattern recognition, the management center 160 can provide an instruction to each security agent 150 that causes the network traffic interceptor 200-1 to drop the connection attempt packet originating at that computer from remote source or sources that are attempting to denial of service attack. The amount of time the transpires from the beginning of the denial of service attack to its detection and transmission of the instruction to the network traffic interceptor 200-1 to drop packets can be small enough avoid significant loss of service by the network 105.

In another alternative configuration, the real-time or close to real-time capability to analyze security histories 216 for multiple computer systems 210 allows the security system disclosed herein to rapidly identify a malicious attack that spreads itself between computer systems 110 within the network 105, but that morphs itself upon each propagation from one computer system to another in an attempt to avoid detection. As an example, some types of attacks are caused by malicious programs that, during operation resulting in an undesired processing operation, create a new version of themselves having a different filename and possibly even different code in certain parts of executable sections. Such malicious programs will distribute their new versions to other computers in the network in an attempt to be undetected using conventional signature scanning techniques that rely, for example, on virus definitions. The undesired processing operation produced as a result of such programs is often the same however, and the sequence of processing steps occurring just prior to the undesired operation (i.e., the root cause of failure) is the same in each different version of the malicious program. Since the processing just prior to the root cause of failure is the same, a computer system 110 operating a security agent 150 disclosed herein that experiences the failure is able to recover from the undesired processing outcome within the computer system 110 and analyze the security history 216 in response to recovering from the undesired processing outcome to identify the sequence of related processing operations that resulted in the undesired processing outcome. The security agent 150 can then mark the sequence of related processing operations and associated processing outcomes within the security history as being a sequence of processing operations that violates the security policy (i.e., can mark such a sequence as a root cause of a failure) and can distribute the root cause to the management center 160 for distribution to other computers 110 operating other instances of the security agent 150. Thus even though the malicious program morphs itself to attempt to hide its identity (thus preventing conventional name-based scanning software from detecting its presence), the remotely operating security agent 150 that monitors processing operations that occur is equipped to detect the operation that the malicious program will attempt once distributed to that computer 110.

Figure 4:
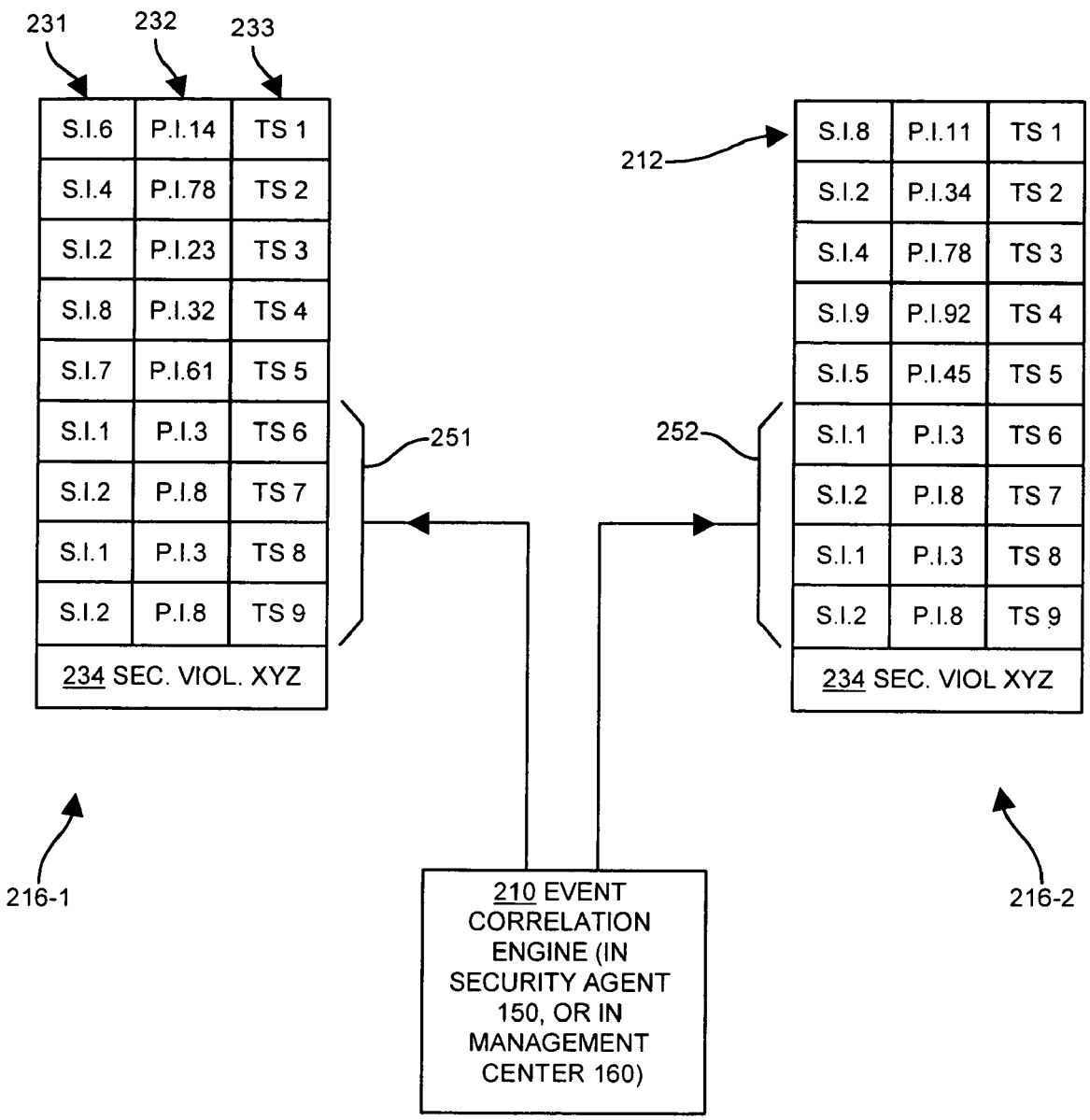
FIG. 4 shows details of comparison of two or more security histories as may be performed by the computer security system disclosed herein.

FIG. 4 illustrates how configurations explained herein perform correlation of event data 212 in different security histories 216 to identify a root cause of an undesired processing operation. Either the event correlation engine 210 in a single security agent 150 (or in the management center application 160) can correlate event data records 212 from one or more local security histories 216 to identify a root cause of an undesired processing operation, or the management center 160 can collect security histories 216 from multiple computer systems 110 to correlate them against each other to identify common processing sequences that result in security violations.

In FIG. 4, two security histories 216-1 and 216-2 are shown that each contain a plurality of event records 212. The event records are simplified in this example to contain an identity 231 of the security interceptor 200 that produced the event data records 212, a processing instruction 232 detected by that security interceptor 200, and a timestamp 233 indicating the time of creation of the event data record. Other information can be included in event data 212 as well, such as process or program identities, program counter information, procedure call or sub-routine information, file names of data to be accessed, dynamically linked library information, and so forth. The security histories 216 in this example configuration also include an indication of a specific security violation 234 produced from one or more undesired processing operations. In this example, both security histories 216-1 and 216-2 indicate a security violation "XYZ." The indication of a security violation 234 may contain, for example, an indication of a type of system level crash, an exception identity, a process identity and program counter location of a processor at a time of exception, a timestamp of the failure, the software or hardware component that produced the error, an so forth. The security agent 150 can obtain such a specific security violation 234 from the operating system 228 upon recovery from a crash or upon seeing an exception, fault or the like. To do so, upon startup of the operating system 228, the security agent 150 can register with any required signal handlers in the operating system 228 to be notified of such security events, failures, process exceptions and so forth.

Upon detection of a specific security violation 234, the event correlation engine 210 is able to perform a comparison of the two or more security histories 216 to identify common sequences of processing operations, such as sequences 251 and 252, containing a similar (or the same) sequence of instructions that preceded the specific security violation 234. If two or more security histories 216 indicate the same specific security violation 234, and have a matching set of one or more processing operations 251 and 252, those processing operations that match are indicated as being a sequence of undesired processing operations 251 and 252 that caused the security violation. Note that timestamp data 233 can be used between the two security histories 216-1 and 216-2 to see if the time difference between each processing instruction in each sequence 251 and 252 in each security history shows approximately the same difference in time between instruction executions. In this manner, the sequences 251 and 252 are marked as being a newly detected undesired sequence of operations that are the root cause of a security violation. Depending upon the configuration, more advanced comparison or pattern-matching techniques can be applied using different information contained in each event data record 212. As an example, program counter data or processor state information can be captured and used to identify execution sequence order of instructions and verify that the same instruction in each history 216 caused the failure or other security violation 234.

Accordingly, the security agents 150 can produce many respective security histories 216 that can be cross-correlated to one another, either locally by the same security agent 150, or remotely at the management center from different agents 150, to identify sequences of undesirable processing operations that create security violations. Once identified, the security agent 150 or management center 160 can adapt the security policy 211 to include the root common cause of processing operations as producing an undesired processing outcome (e.g., a security violation). This information can then be transmitted to other security agents 150 to inform them of a newly identified sequence of undesirable processing operations. If the security agent 150 perform the history comparison locally, it can inform the management center 160 of the newly detected sequence of undesired processing operations that cause the undesired processing outcome and the management center 160 can then disseminate this to other agents 150, or alternatively, the agents can broadcast or otherwise transmit this information directly to other agents 150, depending upon the configuration. In this manner, the other agents 150 can learn of new sequence of processing operations that result in security violations and add this to their security policy 211.

Once a security agent 150 is made aware of a new sequence of processing operations that, if executed, results in an undesired processing outcome, that security agent 150 can maintain this in the security policy 211 and can instruct the appropriate security interceptors 200 (as identified in the security history 216 in an event data record 212) to disallow or deny operation of at least a portion of that sequence of related processing operations within the computerized device to avoid violation of the security policy.

The security policy 211 includes a set of rules being enforced and can indicate sequences of processing operations that are to be disallowed for that computer 110. An administrator 103 creates initial security policies 211 using the management center application 160 by adding or creating policy modules defining rules to be applied to a specific computer 110 for known types of attacks. A security policy 211 for a particular host 110 is the sum of the rules that are contained in policy modules that are associated with the Groups of which the host is a member. There can be a number of pre-designed Policy Modules for know attacks that indicate what processing operations are to be disallowed by prevent that attack. The Security Policy 211 may be built up from one or several of the pre-designed Policy Modules or from custom-designed Policy Modules. The comparison processing disclosed above can cause the security policy 211 to grow to include those newly discovered violations as well.

FIGS. 5 through 8 are a flow chart of example processing operations performed by the computer security system as disclosed herein that use the aforementioned processing capabilities and mechanisms.

Figure 5:
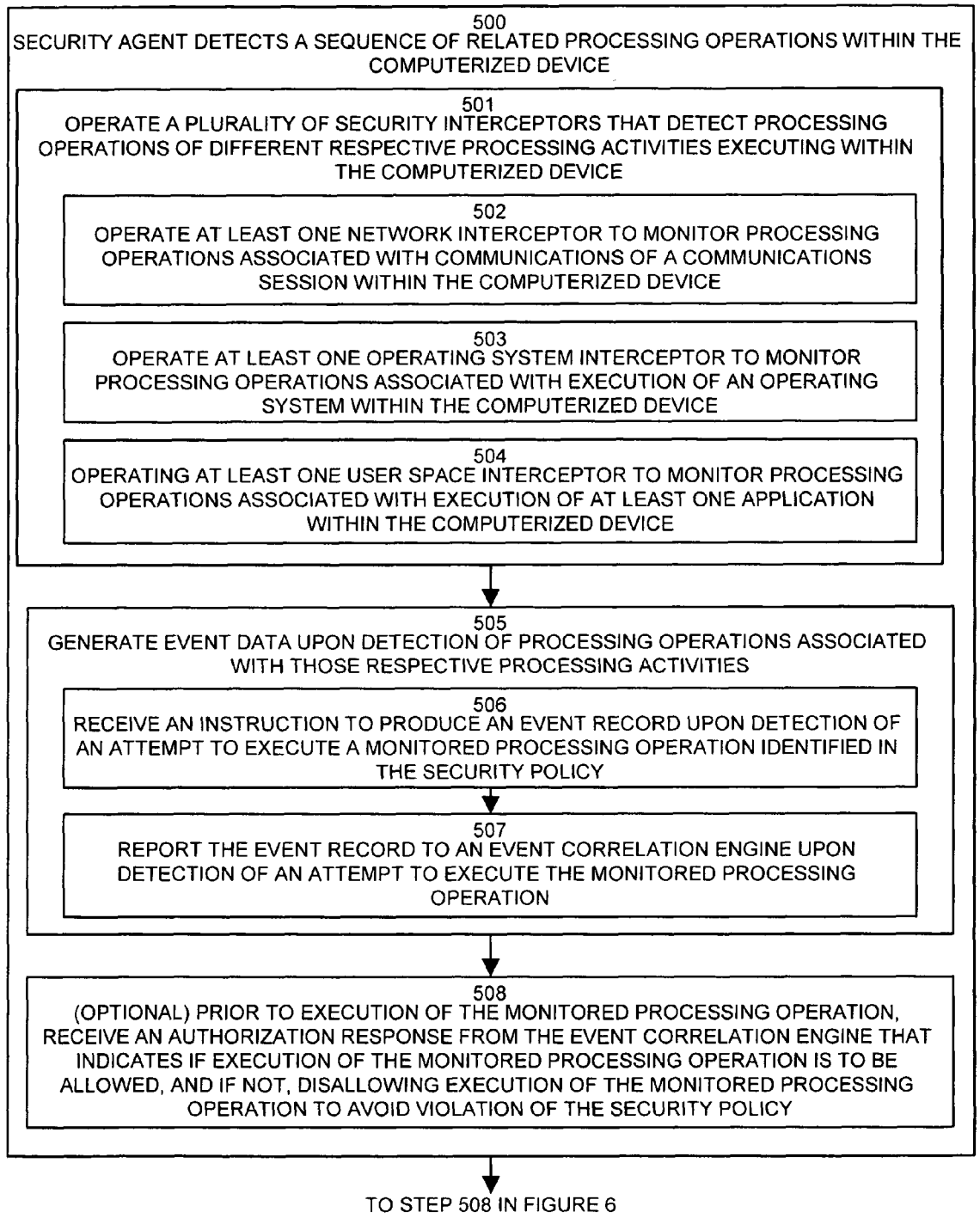
FIGS. 5 through 8 are a flow chart of example processing operations performed by the computer security system as disclosed herein.

Beginning at step 500 in FIG. 5, a security agent 150 detects a sequence of related processing operations within a computerized device 110. Sub-steps 501 through 508 show processing details in one configuration to perform step 500.

In step 501 the security agent 150 operates a plurality of security interceptors 200 that detect processing operations of different respective processing activities (i.e., components 220 through 228 in the example shown in FIG. 2) executing within the computerized device 110.

In step 502 the security agent 150 operates at least one network interceptor to monitor processing operations associated with communications of a communications session within the computerized device.

In step 503 the security agent 150 operates at least one operating system interceptor to monitor processing operations associated with execution of an operating system within the computerized device.

In step 504 the security agent 150 operates at least one user space interceptor to monitor processing operations associated with execution of at least one application within the computerized device.

In step 505 the security agent 150 generates event data upon detection of processing operations associated with those respective processing activities. Steps 506 and 507 show details of this processing.

In step 506 the security agent 150 receives an instruction to produce an event record upon detection of an attempt to execute a monitored processing operation identified in the security policy.

In step 507 the security agent 150 reports the event record to an event correlation engine upon detection of an attempt to execute the monitored processing operation.

Step 508 is an optional step. In step 508, prior to execution of the monitored processing operation, the security agent 150 receives an authorization response from the event correlation engine that indicates if execution of the monitored processing operation is to be allowed, and if not, disallows execution of the monitored processing operation to avoid violation of the security policy. In this configuration then, each processing operation (or only certain processing operations identified by the security policy) can require a confirmation from the event correlation engine prior to the interceptor 200 allowing them to proceed. This can involve prompting the user of the computer system 110 with an indication of what operation is about to be performed, and allowing the user to confirm or deny allowance of that operation.

Figure 6:
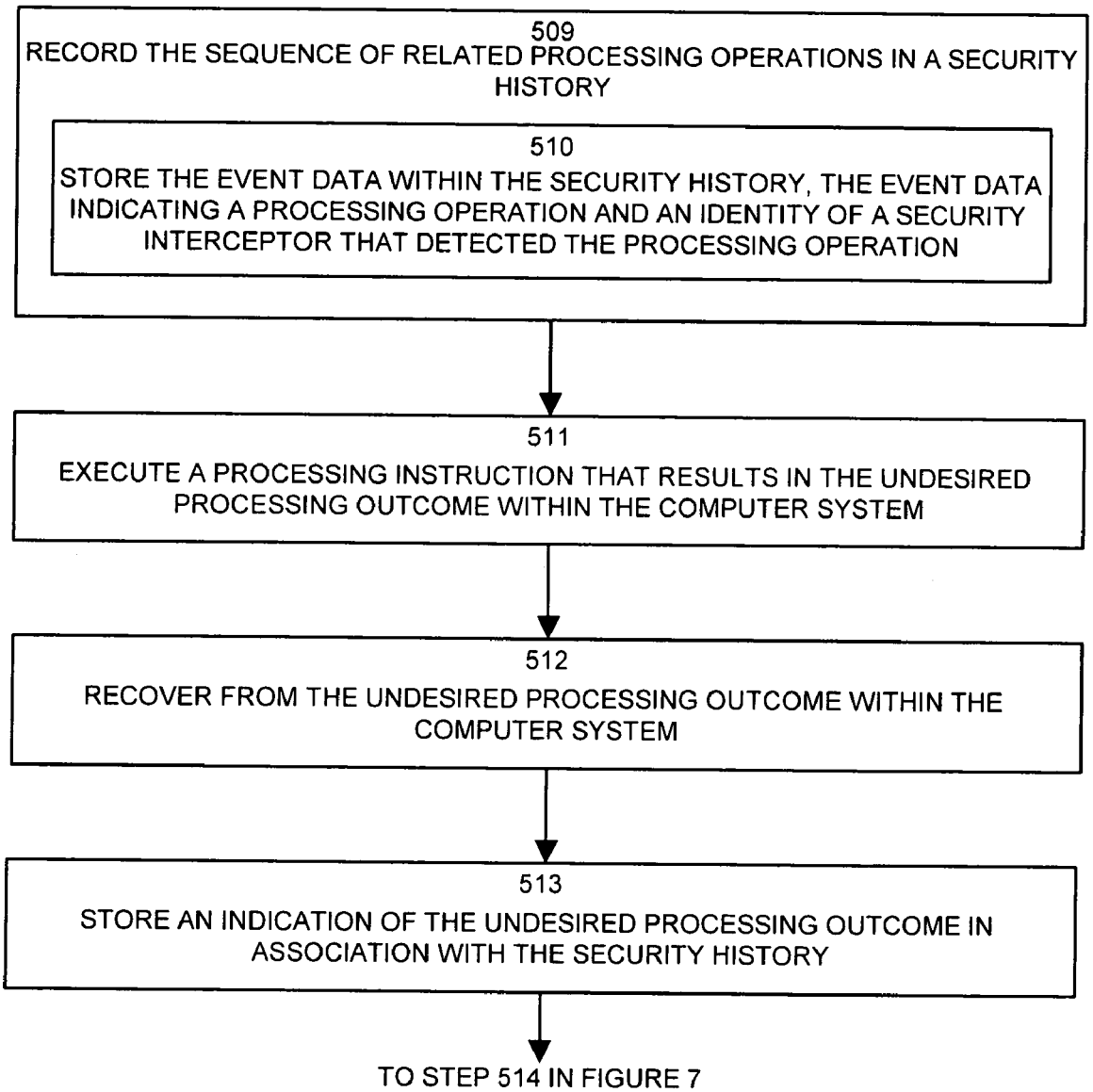

FIG. 6 is a continuation of the flow chart of processing of FIG. 5.

In step 509 in FIG. 6, the security agent 150 records the sequence of related processing operations in a security history.

In step 510 the security agent 150 stores the event data within the security history. The event data indicates a processing operation and an identity of a security interceptor that detected the processing operation. As explained above, other information can be included as well.

In step 511 the security agent 150 executes a processing instruction that results in the undesired processing outcome within the computer system. This can cause a process exception, fault, system crash, security policy violation or any other type of operation that is unwanted.

In step 512 the security agent 150 recovers from the undesired processing outcome within the computer system. This may involve a reboot of the computer 110, or may not require any specific operation since the operating system may perform all needed recovery, such as clearing a faulted process from memory, saving state, etc.

Once recovered, in step 513 the security agent 150 can identify that the undesired processing operation occurred and stores an indication of the undesired processing outcome in association with the security history. This allows the sequence of processing operations recorded in the security history to now be associated with a specific type of undesired processing operation.

Figure 7:
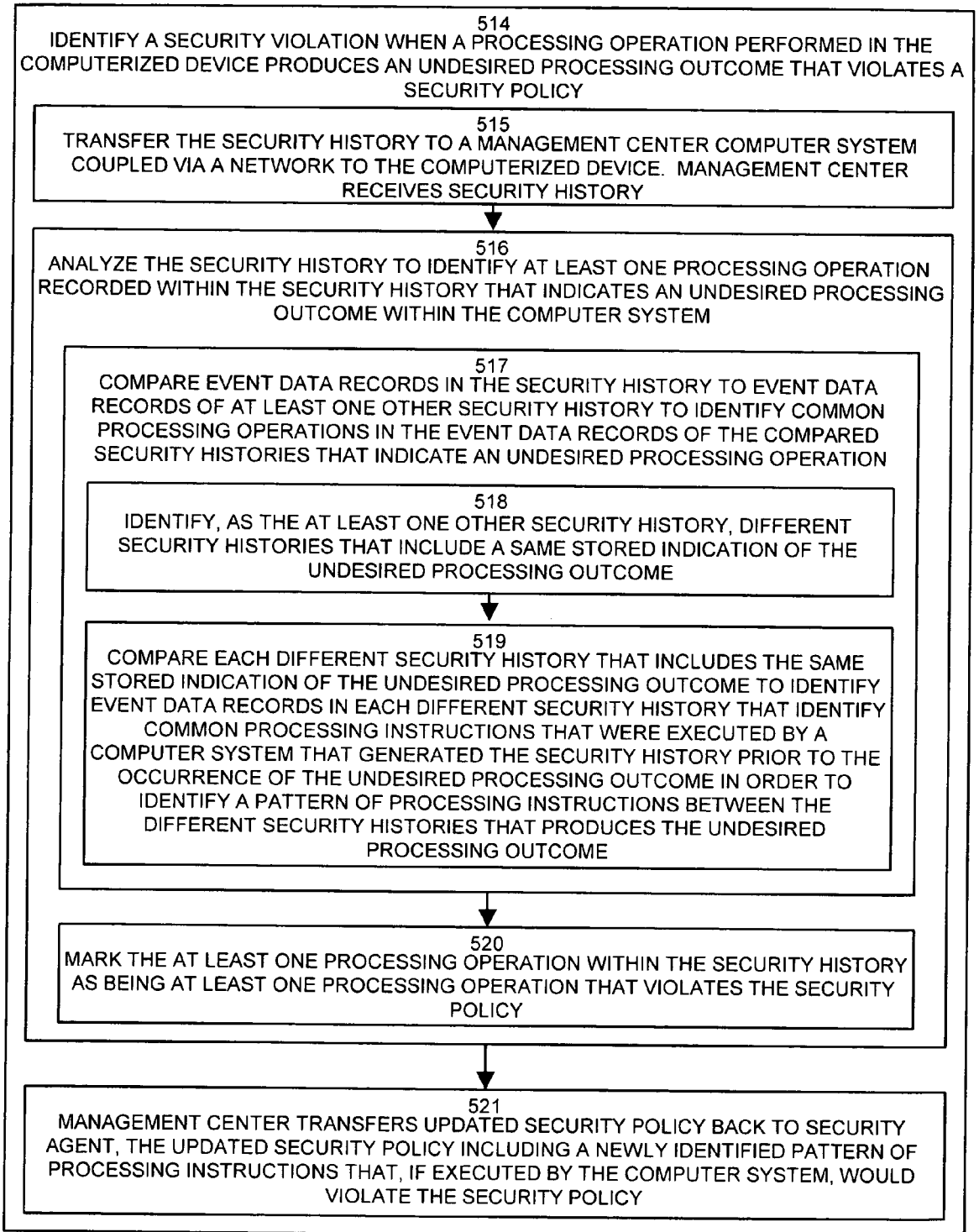

FIG. 7 continues the flow chart of processing steps from FIG. 6.

In step 514 the security system identifies a security violation when a processing operation performed in the computerized device produces an undesired processing outcome that violates a security policy. Note that depending upon the configuration, the sub-steps 516 through 520 can either be performed locally by a security agent 150, or remotely by the management center application 160.

In one configuration, different security histories are produced over time by a single security agent operating in the computer system and the operations of detecting a sequence of related processing operations, recording the sequence of related processing operations in a security history, identifying a security violation, and denying operation of the at least one processing operation within the computerized device to avoid violation of the security policy are performed locally by the security agent 150 operating on the computer system, without requiring updates from a remote computer system such as the management center. In the configuration shown in FIG. 8, the operations involved with identifying a security violation when a processing operation executing in the computerized device 110 produces an undesired processing outcome that violates a security policy are performed first remotely, by the management center computer system, using other security histories (from the same or from other computer systems 110). In other words, in one configuration, the management center application 60 performs the operations shown in Steps 515 through 521. In other configurations, these can be performed locally by a security agent 150 that can access a remote database of stored security histories produced either from itself, or from other security agents 150 that operate on other computers 110.

In step 515 the management center application 160 and the security agent 150 engage in a protocol to transfer the security history to the management center computer system coupled via a network to the computerized device 110.

In step 516 the management center application 160 analyzes the security history to identify at least one processing operation recorded within the security history that indicates an undesired processing outcome within the computer system 110. Steps 517 through 519 show details of this processing in one example configuration.

In step 517 the management center application 160 compares event data records in the security history to event data records of at least one other security history to identify common processing operations in the event data records of the compared security histories that indicate an undesired processing operation. Note that the security histories compared in this operation can be older security histories collected form the same computer system 110, or they might be security histories from many different computer systems.

In step 518, during the comparison process, the management center application 160 identifies, as the other security history(s), different security histories that include a same stored indication of the undesired processing outcome. In other words, the comparison is made between two or more security histories that each contains an indication of a common error or fault. In this manner, the histories are compared to see if there is a commonality of processing that caused the same processing error identified in each.

In step 519 the management center application 160 compares each different security history that includes the same stored indication of the undesired processing outcome to identify event data records in each different security history that identify common processing instructions that were executed by a computer system that generated the security history prior to the occurrence of the undesired processing outcome in order to identify a pattern of processing instructions between the different security histories that produces the undesired processing outcome. This allows the comparison to determine which instructions caused the same error and that were present in the security histories compared to each other.

In step 520 the management center application 160 marks one or more processing operations within the security history as being the processing operations that violates the security policy. The marked processing operations are those that were commonly identified in the compared security histories. In a typical comparison, these are instructions that appear in multiple security histories and that were executed just prior to the fault or failure. Within step 520, there can be an optional operation of there should be an optional operation that verifies that the identified pattern of marked processing operations does not occur during normal operation. In other words, this operational operation can determine that the marked processing operations also must not occur in security histories that do not include the specific security violation.

In step 521 the management center application 160 transfers an updated security policy back to security agent 150. The updated security policy includes a newly identified pattern of processing instructions that, if executed by the computer system, would violate the security policy. These are the processing instructions that caused the fault as identified by matching the security histories to one another.

Figure 8:
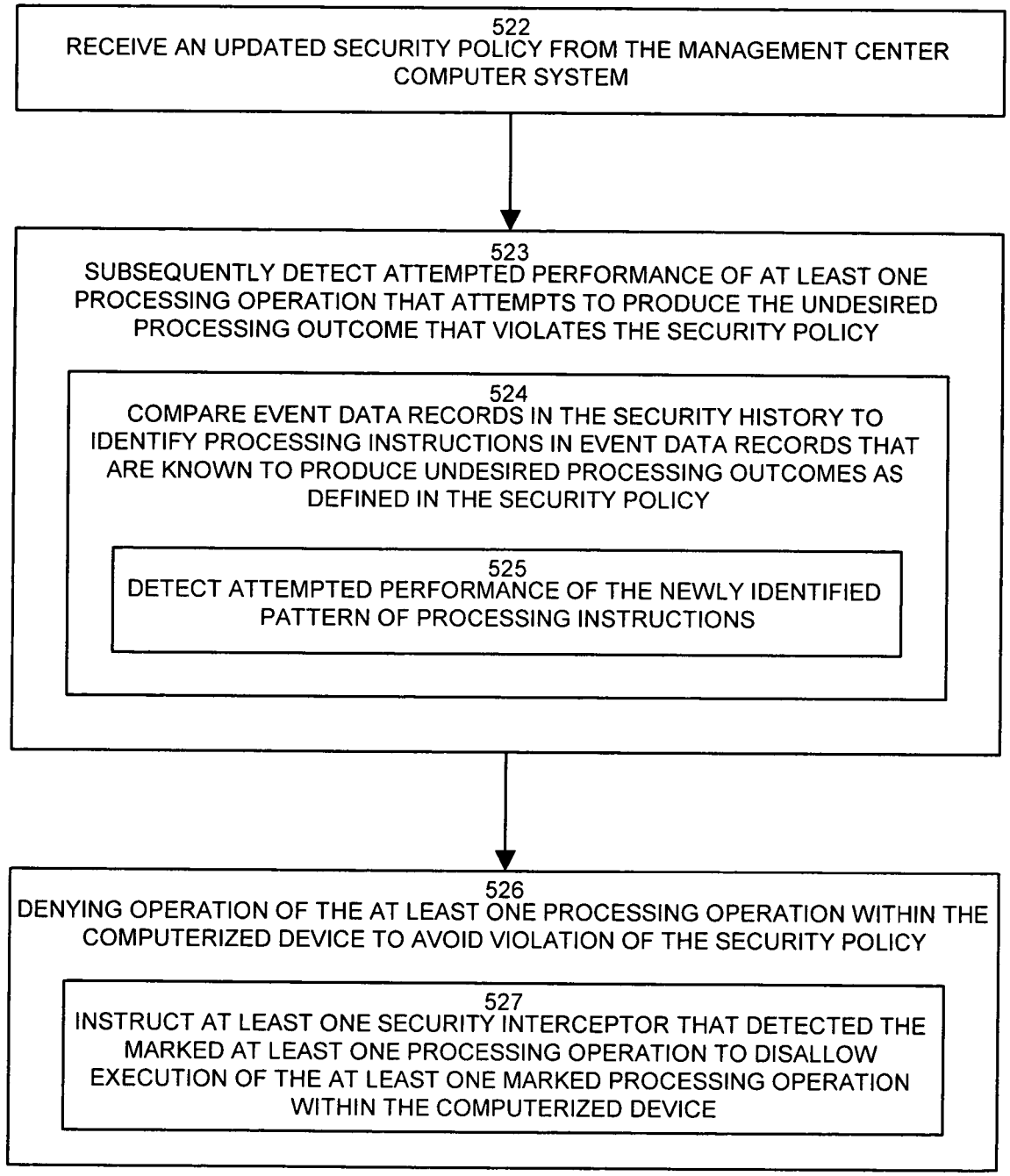

FIG. 8 continues the flow chart of processing steps from FIG. 7.

In step 522 the security agent 150 receives an updated security policy from the management center computer system. The updated security policy now includes the identification of the newly identified processing operations that caused the undesired operation. In this manner, the security policy can grow and adapt as network attacks evolve.

In step 523 the security agent 150 subsequently detects attempted performance of at least one processing operation that attempts to produce the undesired processing outcome that violates the security policy.

To do so, in step 524 the security agent 150 compares event data records in the security history to identify processing instructions in event data records that are known to produce undesired processing outcomes as defined in the security policy.

Specifically, in step 525 the security agent 150 detects attempted performance of the newly identified pattern of processing instructions. In this manner, upon a fault, the operations causing the fault can be quickly identified and marked for detection the next time they attempt to execute.

In step 526 the security agent 150 denies operation of the newly identified malicious processing operation(s) within the computerized device to avoid violation of the security policy.

To do so, in step 527 the security agent 150 instructs at least one security interceptor 200 that detected the marked processing operation(s) to disallow execution of the marked processing operation(s) within the computerized device 110.

In this manner, each time a new fault occurs in one computer, the analysis process above can locate and identify those instructions that caused the fault and can identify these as unallowable instructions for future operation computers. The management center 160 or individual security agents 150 can distribute this information to other security agents in updated security policies so that a problem detected and identified in one performance of the processing explained herein for one computer in the network 105 can prevent the occurrence in many computer systems, even before they experience the problem. Since the analysis is fast, other computers can be notified of the unallowable instructions prior to the malicious attack propagating itself to other computers 110.

While the system and method have been particularly shown and described with references to configurations thereof, it will be understood by those skilled in the art that various changes in form and details may be made therein without departing from the scope of the invention encompassed by the appended claims. Accordingly, the present invention is not intended to be limited by the example configurations provided above.

What is claimed is:

1. A method comprising:
   operating a plurality of security interceptors that monitor operation of different respective processing activities of a computerized device to detect a sequence of related processing operations within the computerized device for those respective processing activities;

recording, in a security history, the sequence of related processing operations for each processing activities in the computerized device;

identifying an undesired processing operation and in response, comparing the security history to at least one formerly collected security history to identify a common sequence of related processing operations that occurred in each security history before occurrence of the undesired processing operation, and in response, marking the common sequence of related processing operations as being a disallowed sequence of related processing operations in a security policy; and operating the plurality of security interceptors to subsequently detect attempted performance of the disallowed sequence of related processing operations, and in response, denying operation of the disallowed sequence of related processing operations by at least one of the processing activities within the computerized device to avoid violation of the security policy.

2. The method of claim 1, further comprising:

detecting from one or more of the plurality of security interceptors, the sequence of related processing operations;

where detecting a sequence of related processing operations within the computerized device comprises:
generating event data upon detection of processing operations associated with those respective processing activities; and where recording the sequence of related processing operations in a security history comprises:
storing the event data within the security history, the event data indicating a processing operation and an identity of a security interceptor that detected the processing operation.

3. The method of claim 2, where denying operation of the disallowed sequence of related processing operations by at least one of the processing activities within the computerized device to avoid violation of the security policy comprises:
instructing at least one security interceptor that detected the marked at least one processing operation to disallow execution of the at least one marked processing operation within the computerized device.

4. The method of claim 3, where comparing the security history to at least one formerly collected security history to identify a common sequence of related processing operations that occurred in each security history before occurrence of the undesired processing operation comprises:

comparing event data records in the security history to event data records of at least one other security history to identify the common sequence of related processing operations in the event data records of the compared security histories that indicate an undesired processing operation.

5. The method of claim 4, wherein identifying the undesired processing operation comprises:

executing the undesired processing operation resulting in an undesired processing outcome within the computer system;
recovering from the undesired processing outcome within the computer system; and
storing an indication of the undesired processing outcome in association with the security history;
in response to recovering from the undesired processing outcome, analyzing the security history to identify the undesired processing operation.

6. The method of claim 5, where comparing event data records in the security history to event data records of at least one other security history to identify the common sequence of related processing operations in the event data records of the compared security histories that indicate an undesired processing operation comprises:

identifying, as the at least one other security history, different security histories that include a same stored indication of the undesired processing outcome; and
comparing each different security history that includes the same stored indication of the undesired processing outcome to identify event data records in each different security history that identify common processing instructions that were executed by a computer system that generated the security history prior to the occurrence of the undesired processing outcome in order to identify a pattern of processing instructions between the different security histories that produces the undesired processing outcome.

7. The method of claim 6, where the different security histories are produced over time by a single security agent operating in the computer system and where the operations of detecting a sequence of related processing operations, recording the sequence of related processing operations in a security history, identifying an undesired processing operation, and denying operation of the sequence of the disallowed sequence of related processing operations are performed locally by the security agent operating on the computer system without requiring updates from a remote computer system.

8. The method of claim 6, comprising:

transferring the security history to a management center computer system coupled via a network to the computerized device;
where the operations involved with identifying an undesired processing operation are performed remotely by the management center computer system; and
where the method comprises:
receiving an updated security policy from the management center computer system, the updated security policy including a newly identified pattern of processing instructions that, if executed by the computer system, would violate the security policy; and
where subsequently detecting attempted performance of the disallowed sequence of related processing operations comprises:
detecting attempted performance of the newly identified pattern of processing instructions.

9. The method of claim 8, where subsequently detecting attempted performance of the disallowed sequence of related processing operations comprises:

comparing event data records in the security history to identify processing instructions in event data records that are known to produce undesired processing outcomes as defined in the security policy.

10. The method of claim 1, where the sequence of related processing operations recorded in the security history identify processing operations from executing of a sequence of related calls to software entities within a computer system that result in violation of the security policy for a first time; and where the operation of subsequently detecting attempted performance of the disallowed sequence of processing operations comprises:
detecting attempted performance of the sequence of related calls to software entities within a computer system that, if performance were completed, would result in violation of the security policy a second time; and where denying operation of the disallowed sequence of related processing operations comprises:
disallowing performance of the sequence of related calls the second time without requiring modification of the security policy by a management center application outside of the computerized device during a time elapsed from identification of violation of the security policy the first time up to the attempted violation of the security policy by the sequence of related processing operations the second time.

11. The method of claim 10, where executing a sequence of related calls to software processes within a computer system that violate the security policy a first time comprises:
executing a series of related system calls that cause an undesired processing outcome within the computer system, the undesired processing outcome being defined in the security policy; and
where identifying a security violation in response to a processing operation executing in the computerized device producing a undesired processing outcome that violates a security policy comprises:
recovering from the undesired processing outcome within the computer system;
analyzing the security history in response to recovering from the undesired processing outcome to identify the sequence of related processing operations that resulted in the undesired processing outcome within the computer system; and
upon determining that if the identified sequence of related processing operations are not part of normal processing operations, marking the sequence of related processing operations and associated processing outcomes within the security history as being a sequence of processing operations that violates the security policy.

12. The method of claim 11, where the operations of detecting processing outcomes and recording the processing outcomes are repeated N number of times, where N is an integer greater than 1; and
where recording the processing outcomes and the sequence of related processing operations in a security history comprises:
producing N respective security histories, one for each repeated iteration of the operations of detecting processing outcomes and recording the processing outcomes, and wherein a plurality of the N security histories indicate attempted execution of the sequence of processing operations that violates the security policy; and
where analyzing the security history in response to recovering from the undesired processing outcome to identify the sequence of related processing operations that resulted in the undesired processing outcome within the computer system comprises:
correlating those security histories of the N security histories that indicate attempted operation of the sequence of processing operations marked as in violation of the security policy to identify a root common cause of processing operations within each security history that led up to the attempted operation of the sequence of processing operations that violates the security policy; and
adapting the security policy to include the root common cause of processing operations as producing an undesired processing outcome.

13. The method of claim 12, where subsequently detecting attempted performance of a similar sequence of related processing operations that attempt to produce at least one undesired processing outcome that violates the security policy comprises:
operating a plurality of security interceptors that monitor operation of different respective processing activities of the computerized device to detect an attempt to perform the root common cause of processing operations identified within each security history that produces an undesired processing outcome,
where denying operation of at least a portion of the sequence of related processing operations within the computerized device to avoid violation of the security policy comprises:
disallowing operation of the root common cause of processing operations to avoid violation of the security policy.

14. The method of claim 1, where operating the plurality of security interceptors comprises:
operating at least one network interceptor to monitor processing operations associated with communications of a communications session within the computerized device;
operating at least one operating system interceptor to monitor processing operations associated with execution of an operating system within the computerized device; and
operating at least one user space interceptor to monitor processing operations associated with execution of at least one application within the computerized device.

15. The method of claim 14, where each of the network interceptor, operating system interceptor and user space interceptor performs:
receiving an instruction to produce an event record upon detection of an attempt to execute a monitored processing operation identified in the security policy;
reporting the event record to an event correlation engine upon detection of an attempt to execute the monitored processing operation; and
prior to execution of the monitored processing operation, receiving an authorization response from the event correlation engine that indicates if execution of the monitored processing operation is to be allowed, and if not, disallowing execution of the monitored processing operation to avoid violation of the security policy.

16. The method of claim 1, where identifying an undesired processing operation comprises:
detecting at least one processing operation that matches a sequence of instructions related to an undesired processing outcome produced as a result of at least one of:
a virus attack, a worm attack, a Trojan horse attack, a Denial-of-service attack, a Buffer overflows operation, execution of Malformed application data, and execution of Malicious mobile code.

17. A computerized device, comprising: a memory;
a processor;
a communications interface coupled to a network;
an interconnection mechanism coupling the memory, the processor and the communications interface;
where the memory is encoded with a security agent, that when executed on the processor, causes the processor to perform:
operating a plurality of security interceptors that monitor operation of different respective processing activities of the computerized device to detect a sequence of related processing operations within the computerized device for those respective processing activities;
recording, in a security history, the sequence of related processing operations for each processing activities in the computerized device;

identifying an undesired processing operation and in response, causing comparison of the security history to at least one formerly collected security history to identify a common sequence of related processing operations that occurred in each security history before occurrence of the undesired processing operation, and in response, marking the common sequence of related processing operations as being a disallowed sequence of related processing operations in a security policy; and operating the plurality of security interceptors to subsequently detect attempted performance of the disallowed sequence of related processing operations, and in response, denying operation of the disallowed sequence of related processing operations by at least one of the processing activities within the computerized device to avoid violation of the security policy.

18. The computerized device of claim 17, wherein the security agent further causes the processor to perform operations of:

detecting from one or more of the plurality of security interceptors, the sequence of related processing operations;

where detecting a sequence of related processing operations within the computerized device comprises:

generating event data upon detection of processing operations associated with those respective processing activities; and where recording the sequence of related processing operations in a security history comprises:

storing the event data within the security history, the event data indicating a processing operation and an identity of a security interceptor that detected the processing operation.

19. The computerized device of claim 18, where denying operation of the disallowed sequence of related processing operations by at least one of the processing activities within the computerized device to avoid violation of the security policy comprises:

instructing at least one security interceptor that detected the marked at least one processing operation to disallow execution of the at least one marked processing operation within the computerized device.

20. A computer readable medium including computer program logic instruction encoded thereon, that when executed on a processor in a computerized device, prevent performance of processing operations that produce processing outcomes that violate a security policy in the computerized device, by causing the computerized device to perform the operations of:

operating a plurality of security interceptors that monitor operation of different respective processing activities of the computerized device to detect a sequence of related processing operations within the computerized device for those respective processing activities;

recording, in a security history, the sequence of related processing operations for each processing activities in the computerized device;

identifying an undesired processing operation and in response, comparing the security history to at least one formerly collected security history to identify a common sequence of related processing operations that occurred in each security history before occurrence of the undesired processing operation, and in response, marking the common sequence of related processing operations as being a disallowed sequence of related processing operations in a security policy; and operating the plurality of security interceptors to subsequently detect attempted performance of the disallowed sequence of related processing operations, and in response, denying operation of the disallowed sequence of related processing operations by at least one of the processing activities within the computerized device to avoid violation of the security policy.

21. The computer readable medium of claim 20, further comprising instructions that cause the computerized device to perform operations of:

detecting from one or more of the plurality of security interceptors, the sequence of related processing operations;

where detecting a sequence of related processing operations within the computerized device comprises:

generating event data upon detection of processing operations associated with those respective processing activities; and where recording the sequence of related processing operations in a security history comprises:

storing the event data within the security history, the event data indicating a processing operation and an identity of a security interceptor that detected the processing operation.

22. The computer readable medium of claim 21, where denying operation of the disallowed sequence of related processing operations by at least one of the processing activities within the computerized device to avoid violation of the security policy comprises:

instructing at least one security interceptor that detected the marked at least one processing operation to disallow execution of the at least one marked processing operation within the computerized device.

23. The computer readable medium of claim 22, where comparing the security history to at least one formerly collected security history to identify a common sequence of related processing operations that occurred in each security history before occurrence of the undesired processing operation comprises:

comparing event data records in the security history to event data records of at least one other security history to identify the common sequence of related processing operations in the event data records of the compared security histories that indicate an undesired processing operation.

24. The computer readable medium of claim 23, wherein identifying the undesired processing operation comprises:

executing the undesired processing operation resulting in an undesired processing outcome within the computer system;

recovering from the undesired processing outcome within the computer system; and storing an indication of the undesired processing outcome in association with the security history;

in response to recovering from the undesired processing outcome, analyzing the security history to identify the undesired processing operation.

25. The computer readable medium of claim 24, where comparing event data records in the security history to event data records of at least one other security history to identify the common sequence of related processing operations in the event data records of the compared security histories that indicate an undesired processing operation comprises:

identifying, as the at least one other security history, different security histories that include a same stored indication of the undesired processing outcome; and comparing each different security history that includes the same stored indication of the undesired processing outcome to identify event data records in each different security history that identify common processing instructions that were executed by a computer system that generated the security history prior to the occurrence of the undesired processing outcome in order to identify a pattern of processing instructions between the different security histories that produces the undesired processing outcome.

26. The computer readable medium of claim 25, where the different security histories are produced over time by a single security agent operating in the computer system and where the operations of detecting a sequence of related processing operations, recording the sequence of related processing operations in a security history, identifying an undesired processing operation, and denying operation of the sequence of the disallowed sequence of related processing operations are performed locally by the security agent operating on the computer system without requiring updates from a remote computer system.

27. The computer readable medium of claim 26, further comprising instructions that cause the computerized device to perform operations of:
    transferring the security history to a management center computer system coupled via a network to the computerized device;
    where the operations involved with identifying an undesired processing operation are performed remotely by the management center computer system; and
    receiving an updated security policy from the management center computer system, the updated security policy including a newly identified pattern of processing instructions that, if executed by the computer system, would violate the security policy; and
    where subsequently detecting attempted performance of the disallowed sequence of related processing operations comprises:
        detecting attempted performance of the newly identified pattern of processing instructions.

28. The computer readable medium of claim 27, where subsequently detecting attempted performance of the disallowed sequence of related processing operations comprises:
    comparing event data records in the security history to identify processing instructions in event data records that are known to produce undesired processing outcomes as defined in the security policy.

29. The computer readable medium of claim 20, where the sequence of related processing operations recorded in the security history identify processing operations from executing of a sequence of related calls to software entities within a computer system that result in violation of the security policy for a first time; and
    where the operation of subsequently detecting attempted performance of the disallowed sequence of processing operations comprises:
    detecting attempted performance of the sequence of related calls to software entities within a computer system that, if performance were completed, would result in violation of the security policy a second time; and
    where denying operation of the disallowed sequence of related processing operations comprises:
    disallowing performance of the sequence of related calls the second time without requiring modification of the security policy by a management center application outside of the computerized device during a time elapsed from identification of violation of the security policy the first time up to the attempted violation of the security policy by the sequence of related processing operations the second time.

30. The computer readable medium of claim 29, where executing a sequence of related calls to software processes within a computer system that violate the security policy a first time comprises:
    executing a series of related system calls that cause an undesired processing outcome within the computer system, the undesired processing outcome being defined in the security policy; and
    where identifying a security violation in response to a processing operation executing in the computerized device producing a undesired processing outcome that violates a security policy comprises:
    recovering from the undesired processing outcome within the computer system;
    analyzing the security history in response to recovering from the undesired processing outcome to identify the sequence of related processing operations that resulted in the undesired processing outcome within the computer system; and
    upon determining that if the identified sequence of related processing operations are not part of normal processing operations, marking the sequence of related processing operations and associated processing outcomes within the security history as being a sequence of processing operations that violates the security policy.

31. The computer readable medium of claim 30, where the operations of detecting processing outcomes and recording the processing outcomes are repeated N number of times, where N is an integer greater than 1; and
    where recording the processing outcomes and the sequence of related processing operations in a security history comprises:
    producing N respective security histories, one for each repeated iteration of the operations of detecting processing outcomes and recording the processing outcomes, and wherein a plurality of the N security histories indicate attempted execution of the sequence of processing operations that violates the security policy; and
    where analyzing the security history in response to recovering from the undesired processing outcome to identify the sequence of related processing operations that resulted in the undesired processing outcome within the computer system comprises:
    correlating those security histories of the N security histories that indicate attempted operation of the sequence of processing operations marked as in violation of the security policy to identify a root common cause of processing operations within each security history that led up to the attempted operation of the sequence of processing operations that violates the security policy; and
    adapting the security policy to include the root common cause of processing operations as producing an undesired processing outcome.

32. The computer readable medium of claim 31, where subsequently detecting attempted performance of a similar sequence of related processing operations that attempt to produce at least one undesired processing outcome that violates the security policy comprises:
    operating a plurality of security interceptors that monitor operation of different respective processing activities of the computerized device to detect an attempt to perform the root common cause of processing operations identified within each security history that produces an undesired processing outcome, where denying operation of at least a portion of the sequence of related processing operations within the computerized device to avoid violation of the security policy comprises:
  disallowing operation of the root common cause of processing operations to avoid violation of the security policy.

33. The computer readable medium of claim 20, where operating the plurality of security interceptors comprises:
  operating at least one network interceptor to monitor processing operations associated with communications of a communications session within the computerized device;
  operating at least one operating system interceptor to monitor processing operations associated with execution of an operating system within the computerized device; and
  operating at least one user space interceptor to monitor processing operations associated with execution of at least one application within the computerized device.

34. The computer readable medium of claim 33, where each of the network interceptor, operating system interceptor and user space interceptor performs:
  receiving an instruction to produce an event record upon detection of an attempt to execute a monitored processing operation identified in the security policy;
  reporting the event record to an event correlation engine upon detection of an attempt to execute the monitored processing operation; and
  prior to execution of the monitored processing operation, receiving an authorization response from the event correlation engine that indicates if execution of the monitored processing operation is to be allowed, and if not, disallowing execution of the monitored processing operation to avoid violation of the security policy.

35. The computer readable medium of claim 20, where identifying an undesired processing operation comprises:
  detecting at least one processing operation that matches a sequence of instructions related to an undesired processing outcome produced as a result of at least one of:
  a virus attack, a worm attack, a Trojan horse attack, a Denial-of-service attack, a Buffer overflows operation, execution of Malformed application data, and execution of Malicious mobile code.

* * * * *